United States Patent [19]

Chen

[11] Patent Number: 5,295,717

[45] Date of Patent: Mar. 22, 1994

[54] TUBE CONNECTING DEVICE

[76] Inventor: Waterson Chen, No. 50-10, Shu-Wang Rd., Ta-Li Hsiang, Taichung Hsien, Taiwan

[21] Appl. No.: 28,470

[22] Filed: Mar. 9, 1993

[51] Int. Cl.[5] .................................................. F16L 55/00
[52] U.S. Cl. ...................................... 285/84; 285/312
[58] Field of Search ...................... 285/84, 85, 86, 311, 285/312, 317; 403/321, 322, 49, 325

[56] References Cited

U.S. PATENT DOCUMENTS

| | | | |
|---|---|---|---|
| 1,613,644 | 1/1927 | Costello | 285/87 X |
| 4,295,670 | 10/1981 | Goodall et al. | 285/312 X |

FOREIGN PATENT DOCUMENTS

| | | | |
|---|---|---|---|
| 0029975 | 11/1931 | Australia | 285/311 |
| 0000470 | 1/1914 | United Kingdom | 285/85 |

*Primary Examiner*—Randolph A. Reese
*Assistant Examiner*—Heather Chun
*Attorney, Agent, or Firm*—Kenyon & Kenyon

[57] ABSTRACT

A tube connecting device includes a first tubular connector and a second tubular connector which extends into the first connector and which is formed with an annular peripheral groove that is registered with a pair of radial openings in the first connector. Each of a pair of press arms has one end mounted pivotally to the first connector adjacent to a respective one of the radial openings and formed with a cam face. Each of the press arms is pivotable to a locking position in which the cam face thereof extends into the peripheral groove via the respective radial opening so as to press against the second connector. Each of a pair of retaining units includes a positioning rod which is provided slidably in a positioning bore that is formed in an inner side of a respective press arm. A biasing unit biases the positioning rod so that an end portion of the latter engages a respective retaining seat which projects outwardly from the first connector when the respective press arm is in the locking position.

1 Claim, 12 Drawing Sheets

TUBE CONNECTING DEVICE

BACKGROUND OF THE INVENTION

1. Field of the Invention

The invention relates to a tube connecting device, more particularly to an improved tube connecting device which can be easily installed and which provides firm and stable connection between two tubes.

2. Description of the Related Art

Referring to FIG. 1, a conventional tube connecting device is shown to comprise first and second tubular connector members (1, 5), each of which is connected to one end of a corresponding tube (shown in phantom lines). The first connector member (1) has a receiving end portion (2) and two opposite pairs of pivot ears (3) that project outwardly from the latter. A radial opening (4) is formed between each pair of pivot ears (3). The second connector member (5) extends into the receiving end portion (2) and has an outer surface which is formed with an annular peripheral groove (6). The peripheral groove (6) has an inwardly curved inner end and is registered with the radial openings (4). The tube connecting device further includes a pair of press arms (7), each of which having one end mounted pivotally to a respective one of the pairs of pivot ears (3) and formed with a cam face (8). When the press arms (7) are pivoted to a locking position, the cam faces (8) extend into the peripheral groove (6) via the respective radial opening (4) so as to press against the second connector member (5) at the peripheral groove (6), thereby securing the second connector member (5) to the first connector member (1).

Note that in the above described conventional tube connecting device, the pressing force that is applied by the cam faces (8) is used to secure the second connector member (5) to the first connector member (1). However, no retaining device is provided so as to prevent untimely movement of the press arms (7). Therefore, untimely disengagement between the cam faces (8) and the peripheral groove (6) can occur, thereby resulting in the untimely disengagement of the first and second connector members (1, 5)

In order to overcome the above mentioned drawback, the construction of the conventional tube connecting device shown in FIG. 1 has been modified, as best illustrated in FIG. 2. The first connector member (1') is provided with a pair of opposite retaining projections (9). Each of the retaining projections (9) is formed with a longitudinal through bore (11). Each of the press arms (7') is provided with an opening (12) to permit a corresponding one of the retaining projections (9) to extend therein when the press arms (7') are in the locked position Each of the press arms (7') is further provided with a hook end (13) and a fastening ring (14) provided on the hook end (13).

Referring to FIG. 3, the retaining projections (9) extend into the openings (12) in the press arms (7') after the press arms (7') have been pivoted to the locking position. One end of each of the fastening rings (14) is then extended into the through bore (11) of a respective one of the retaining projections (9), thereby retaining the press arms (7') on the first connector member (1') so as to prevent untimely movement of the former.

Note that although untimely movement of the press arms (7') can be prevented, the act of inserting one end of the fastening rings (14) into the through bore (11) of the respective retaining projection (9) can complicate the installation of the tube connecting device. The conventional tube connecting device shown in FIGS. 2 and 3 is thus inconvenient to use.

SUMMARY OF THE INVENTION

Therefore, the objective of the present invention is to provide an improved tube connecting device which can be easily installed and which can provide firm and stable connection between two tubes.

Accordingly, the tube connecting device of the present invention comprises:

a first tubular connector member having a receiving end portion formed with a pair of opposite radial openings and an extension end portion to be connected to a corresponding tube;

a second tubular connector member having an insert end portion which extends into the receiving end portion and an engaging end portion to be connected to a corresponding tube, said insert end portion having an outer surface which is formed with an annular peripheral groove that is registered with the radial openings;

a pair of press arms, each having one end mounted pivotally to the first connector member adjacent to a respective one of the radial openings and formed with a cam face, each of the press arms being pivotable to a locking position in which the cam face thereof extends into the peripheral groove via the respective radial opening so as to press against the second connector member at the annular groove in order to secure the second connector member to the first connector member;

a pair of retaining seats, each of which projecting outwardly from the first connector member and being disposed below a respective one of the radial openings, each of the retaining seats having an inwardly and downwardly inclined side surface and a bottom formed with a vertical blind bore;

each of the press arms having an inner side which is formed with a longitudinal positioning seat, said positioning seat being formed with an axial positioning bore which is aligned with the blind bore in a respective one of the retaining seats when the press arm is in the locking position; and a pair of retaining units, each of which including: a positioning rod being provided slidably in the positioning bore of a respective positioning seat and having first and second end portions which extend out of the positioning bore; a biasing unit being disposed in the positioning bore of the respective positioning seat and biasing the positioning rod so that a tip of the first end portion is displaced normally from a pivoting axis of a respective press arm by a distance equal to that between a plane lying on the inclined side surface of a respective retaining seat and the pivoting axis of the respective press arm; and a pull ring secured on the second end portion of the positioning rod; the first end portion extending into the blind bore of the respective retaining seat when the respective press arm is in the locking position.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
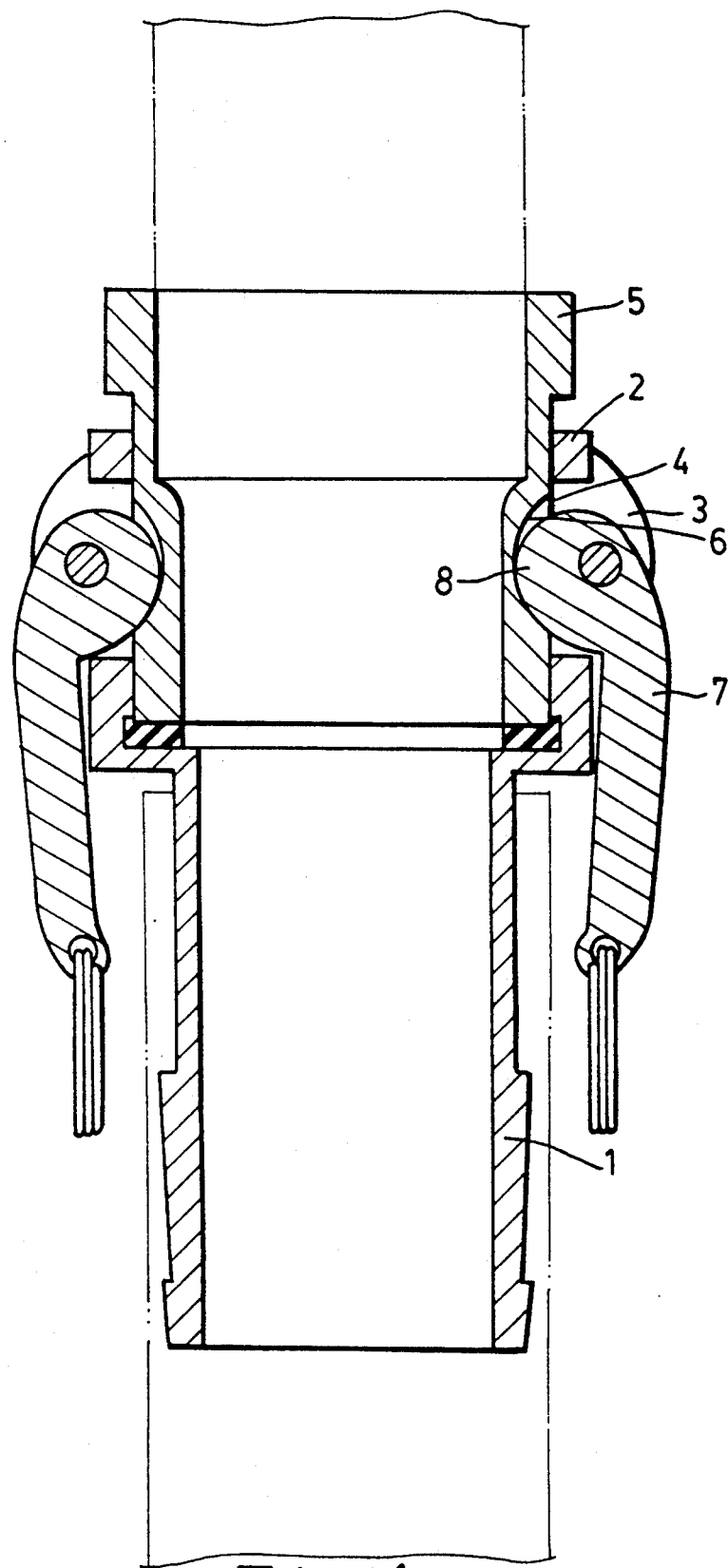
FIG. 1 is a sectional view of a conventional tube connecting device.
Figure 2:
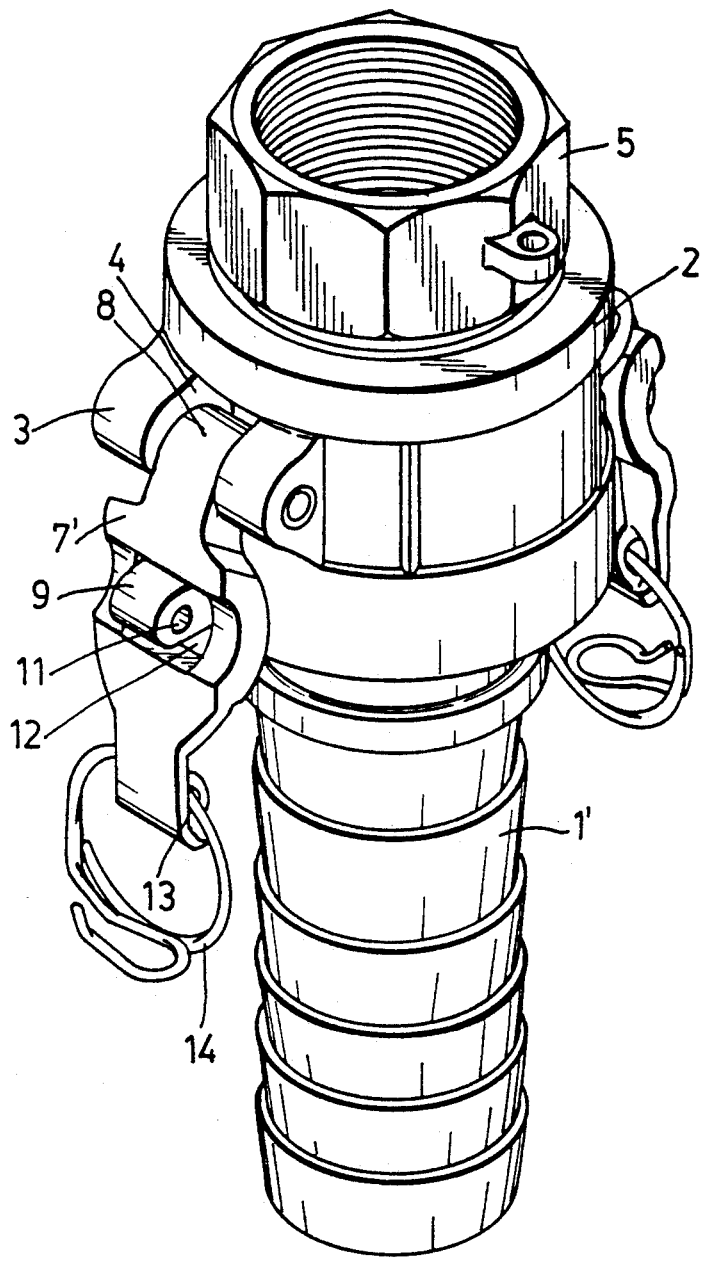
FIG. 2 is a perspective view of another conventional tube connecting device.
Figure 3:
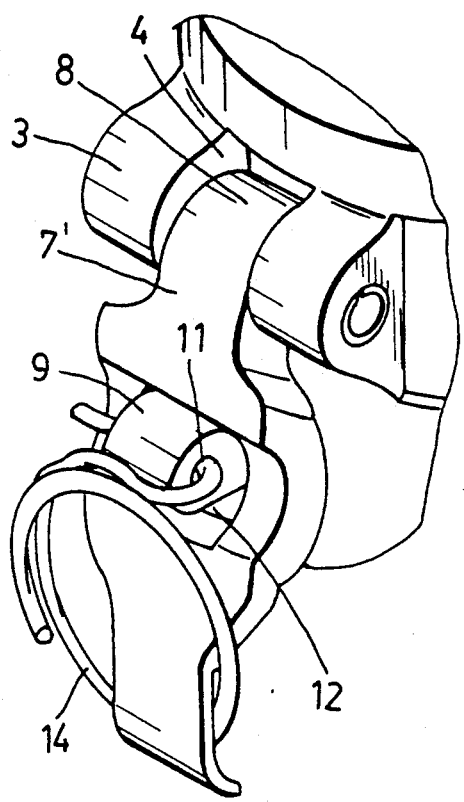
FIG. 3 is an enlarged fragmentary view which illustrates how untimely movement of a press arm of the conventional tube connecting device shown in FIG. 2 is prevented.
Figure 4:
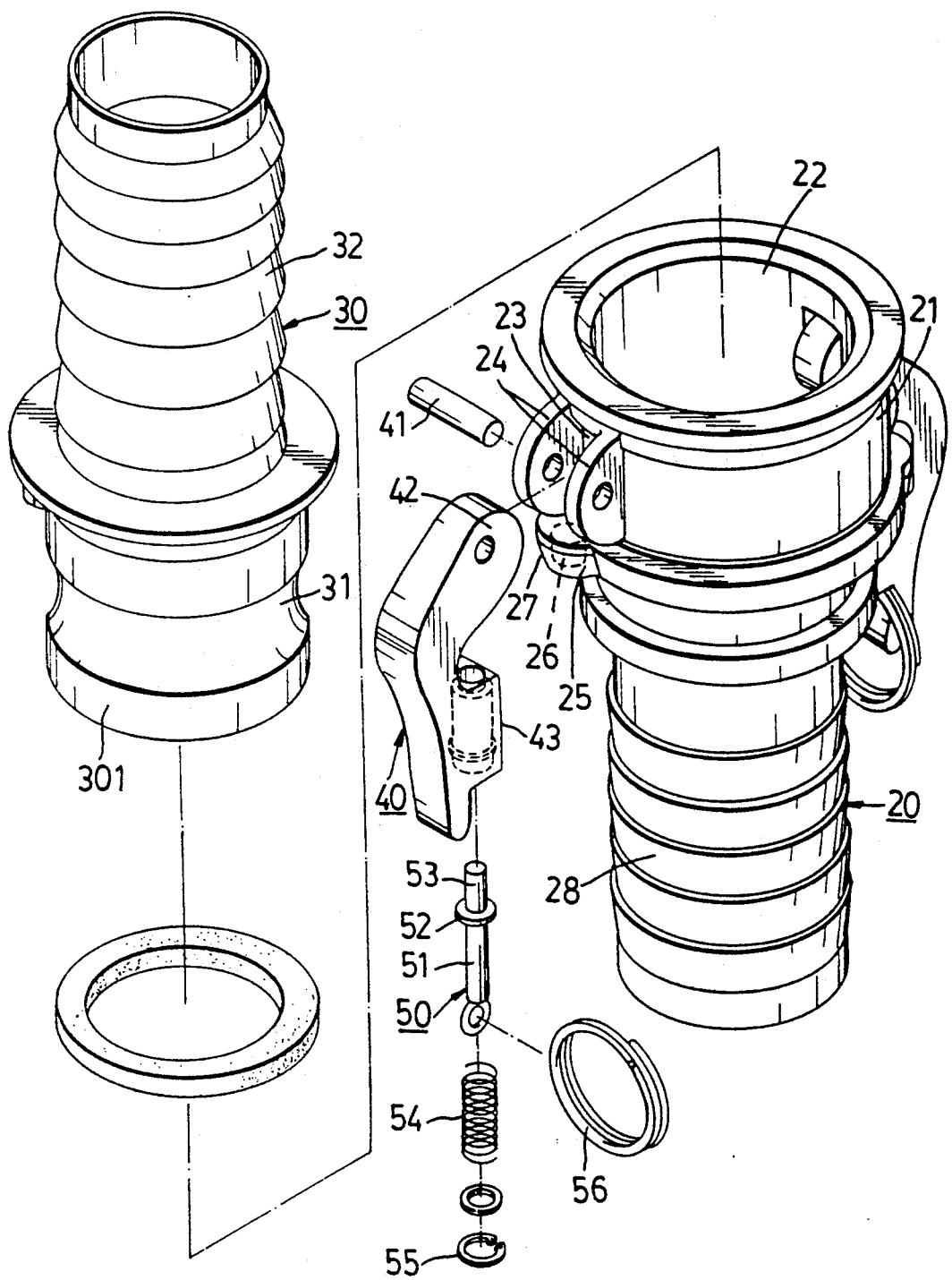
FIG. 4 is an exploded view of the preferred embodiment of a tube connecting device according to the present invention.
Figure 5:
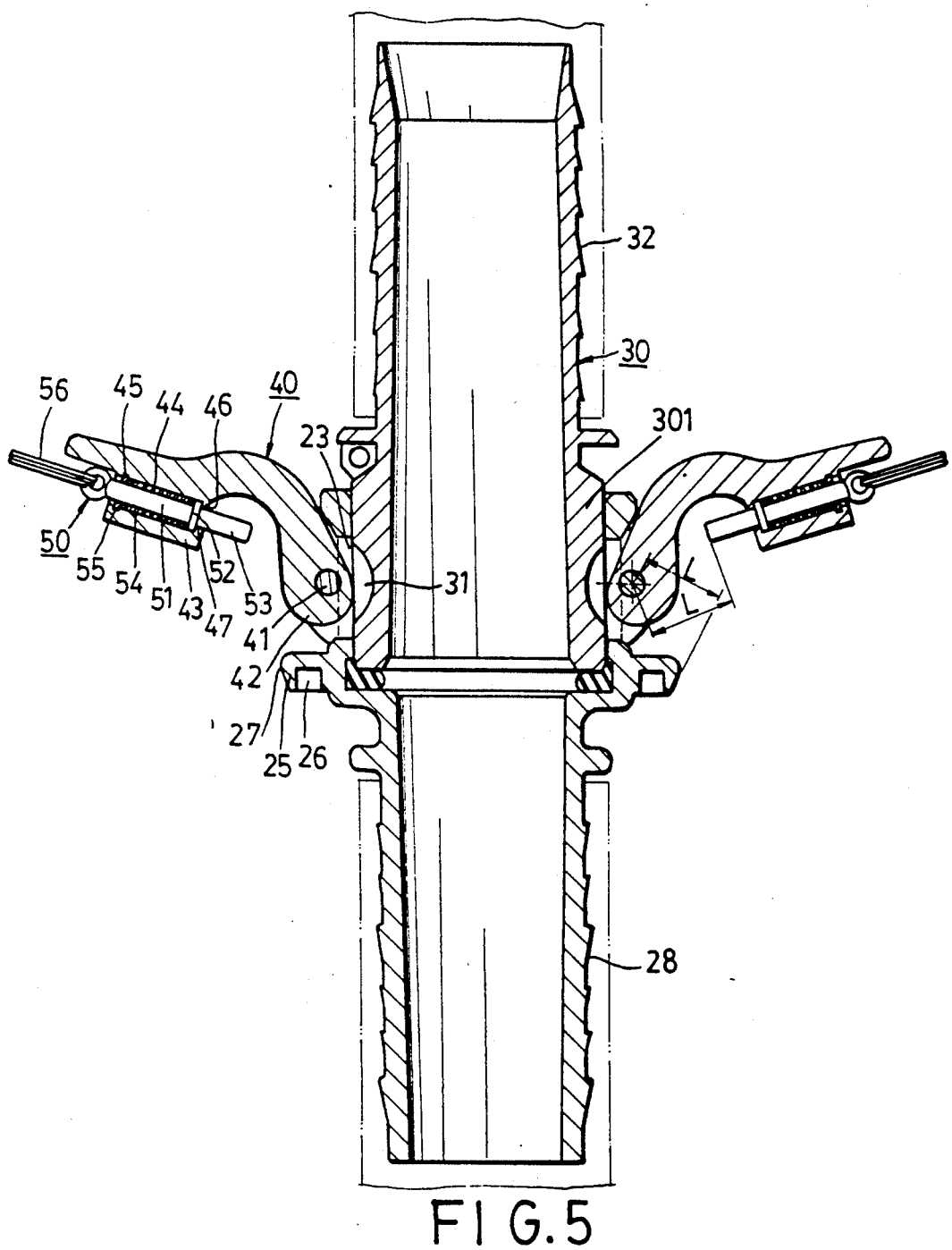
FIG. 5 is a sectional view of the preferred embodiment illustrating its assembly.

Referring to FIGS. 4 and 5, the preferred embodiment of a tube connecting device according to the present invention is shown to comprise a first tubular connector member (20), a second tubular connector member (30), a pair of press arms (40) and a pair of retaining units (50).

The first connector member (20) has a receiving end portion (21) which has an appropriately-sized inner diameter and which confines a hollow receiving space (22) therein. Two opposite pairs of pivot ears (24) project outwardly from the receiving end portion (20). A radial opening (23) is formed between each pair of pivot ears (24). A retaining seat (25) projects outwardly from the receiving end portion (21) below each of the pairs of pivot ears (24). Each of the retaining seats (25) has a bottom formed with a vertical blind bore (26) and further has an inwardly and downwardly inclined side surface (27). The first connector member (20) further has an extension end portion (28) which is adapted to be connected to one end of a corresponding tube (shown in phantom lines). The structural connection between the extension end portion (28) and the corresponding tube is known in the art and will not be detailed herein The second connector member (30) has an insert end portion (301) which extends into the hollow receiving space (22) confined by the receiving end portion (21) of the first connector member (20). The insert end portion (301) has an outer surface which is formed with an annular peripheral groove (31). The peripheral groove (31) has an inwardly curved inner end and is registered with the radial openings (23). The second connector member (30) further has an engaging end portion (32) which is adapted to be connected to one end of a corresponding tube (shown in phantom lines). The structural connection between the engaging end portion (32) and the corresponding tube is known in the art and will not be detailed herein.

Each of the press arms (40) is provided between one of the pairs of pivot ears (24) and has one end which is formed with a cam face (42) and which is mounted pivotally to the pivot ears (24) via a pivot pin (41). Each of the press arms (40) further has an inner side which is formed with a longitudinal positioning seat (43). The positioning seat (43) is formed with an axial positioning bore (44) which is aligned with the blind bore (26) in a respective one of the retaining seats (25) when the press arm (40) is pivoted downwardly to a locked position. An annular retaining groove (45) is formed in an inner wall surface of the positioning seat (43) on one end of the positioning bore (44). The other end of the positioning bore (44) is formed with an inward annular flange (46) which confines a through hole (47) that is coaxial with the positioning bore (44).

Each of the retaining units (50) includes a positioning rod (51) which is provided slidably in the positioning bore (44) of a respective positioning seat (43). The positioning rod (51) has an intermediate portion which is formed with a radial flange (52) and two end portions which extend out of the positioning bore (51). The diameter of the positioning rod (51) corresponds to the size of the through hole (47). A biasing unit, such as a compression spring (54), is disposed in the positioning bore (44) around the positioning rod (51). The compression spring (54) has one end which abuts against the radial flange (52). A C-shaped locking ring (55) is provided around the positioning rod (51) and is received in the retaining groove (45). The locking ring (55) abuts against the other end of the compression spring (54), thereby enabling the compression spring (54) to bias the positioning rod (51) so that a rounded tip of a first end portion (53) of the positioning rod (51) is displaced normally from the axis of the pivot pin (41) by a predetermined distance (L) which is equal to that between a plane lying on the inclined side surface (27) of the respective retaining seat (25). A pull ring (56) is secured on a second end portion of the positioning rod (51) opposite to the first end portion (53).

Figure 6:
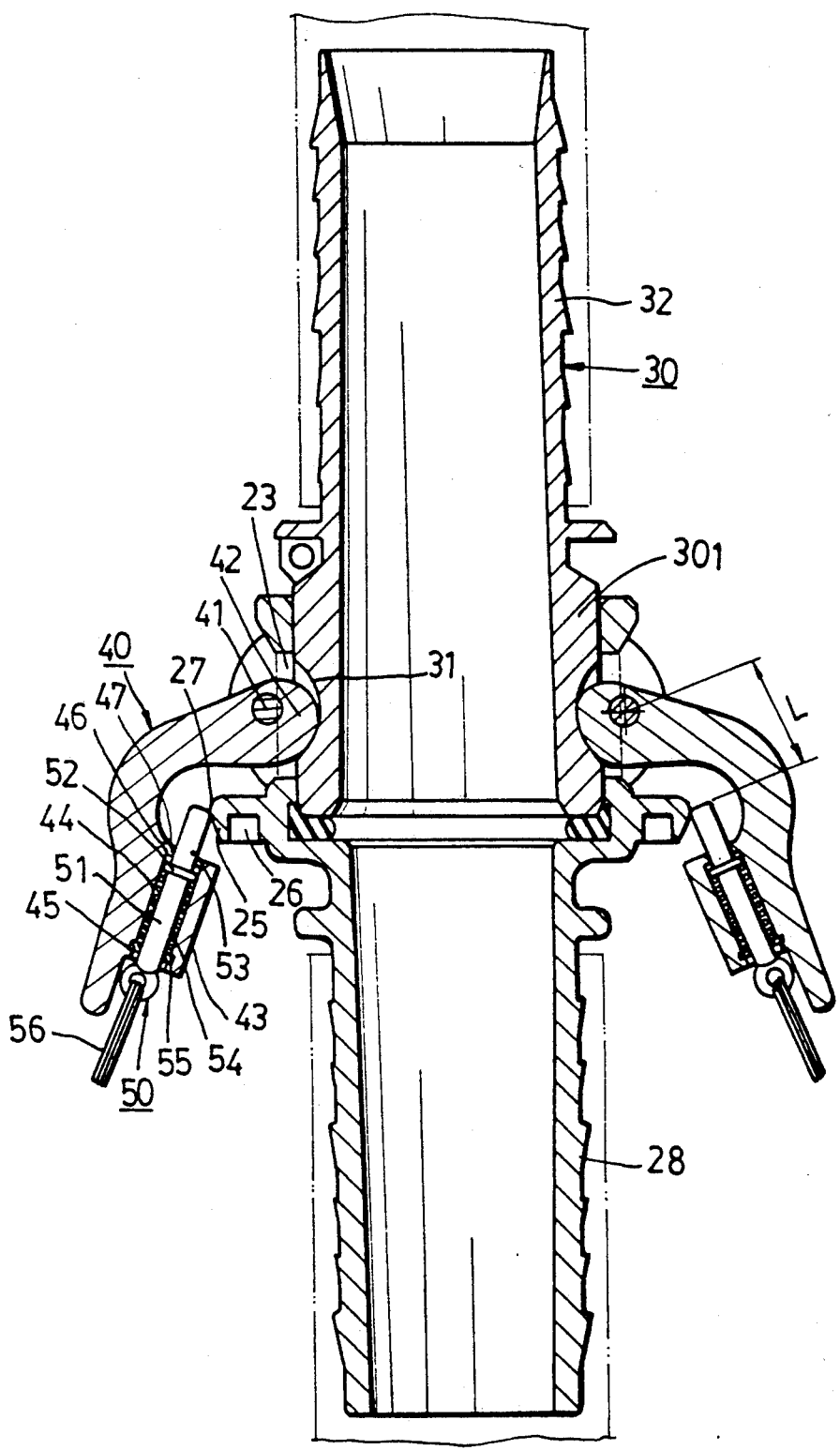
FIG. 6 illustrates the preferred embodiment when press arms thereof are pivoted downwardly so as to secure a second tubular connector member to a first tubular connector member.

Referring to FIGS. 5 and 6, when the insert end portion (301) of the second connector member (30) is inserted within the hollow receiving space (22) in the receiving end portion (21) of the first connector member (20), the peripheral groove (31) is registered with the radial openings (23). The press arms (40) are then pivoted to the locking position toward the extension end portion (28), thereby causing the cam faces (42) of the press arms (40) to extend into the peripheral groove (31) via the respective radial opening (23), as best illustrated in FIG. 6. The cam faces (42) press against the second connector member (30) at the peripheral groove (31), thereby securing the second connector member (30) to the first connector member (20).

Figure 7:
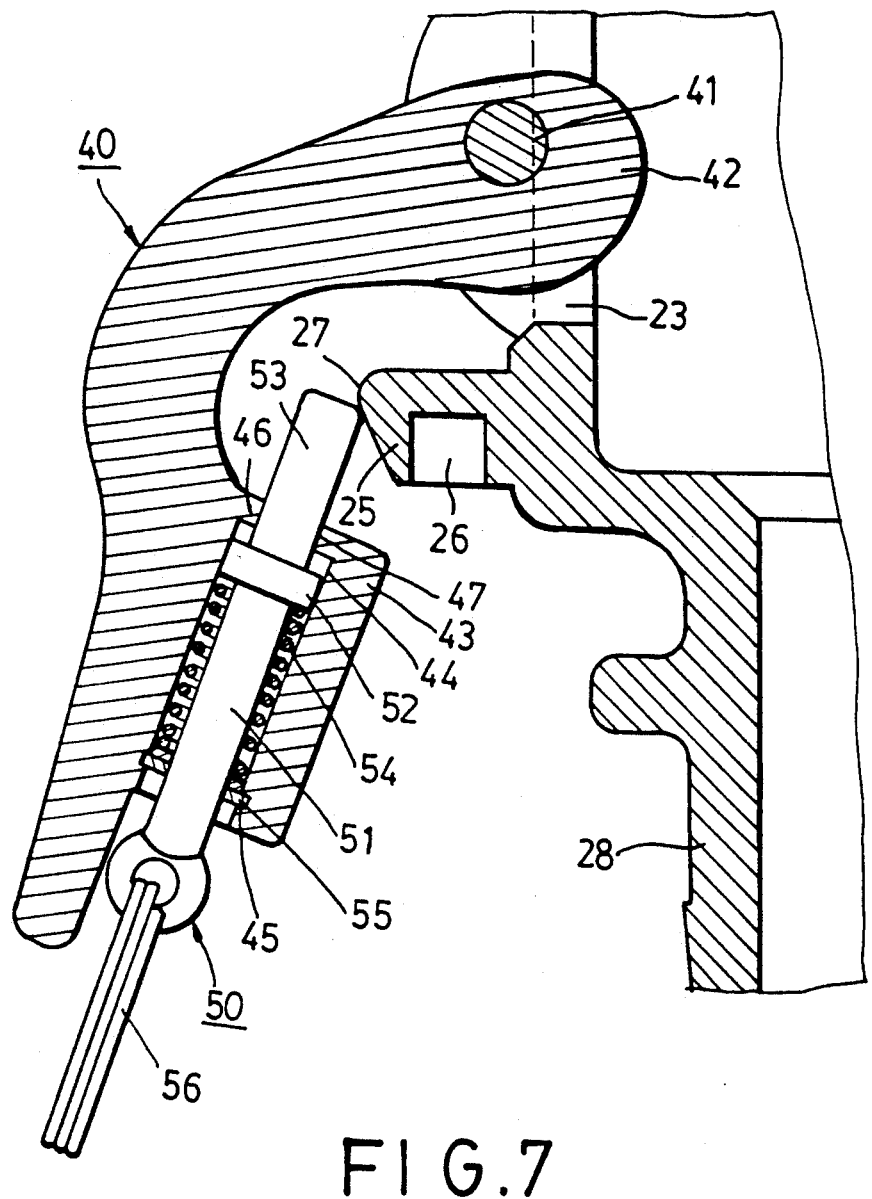
FIG. 7 is an enlarged fragmentary view which illustrates a positioning rod of the preferred embodiment when abutting against an inclined side surface of a retaining seat.
Figure 8:
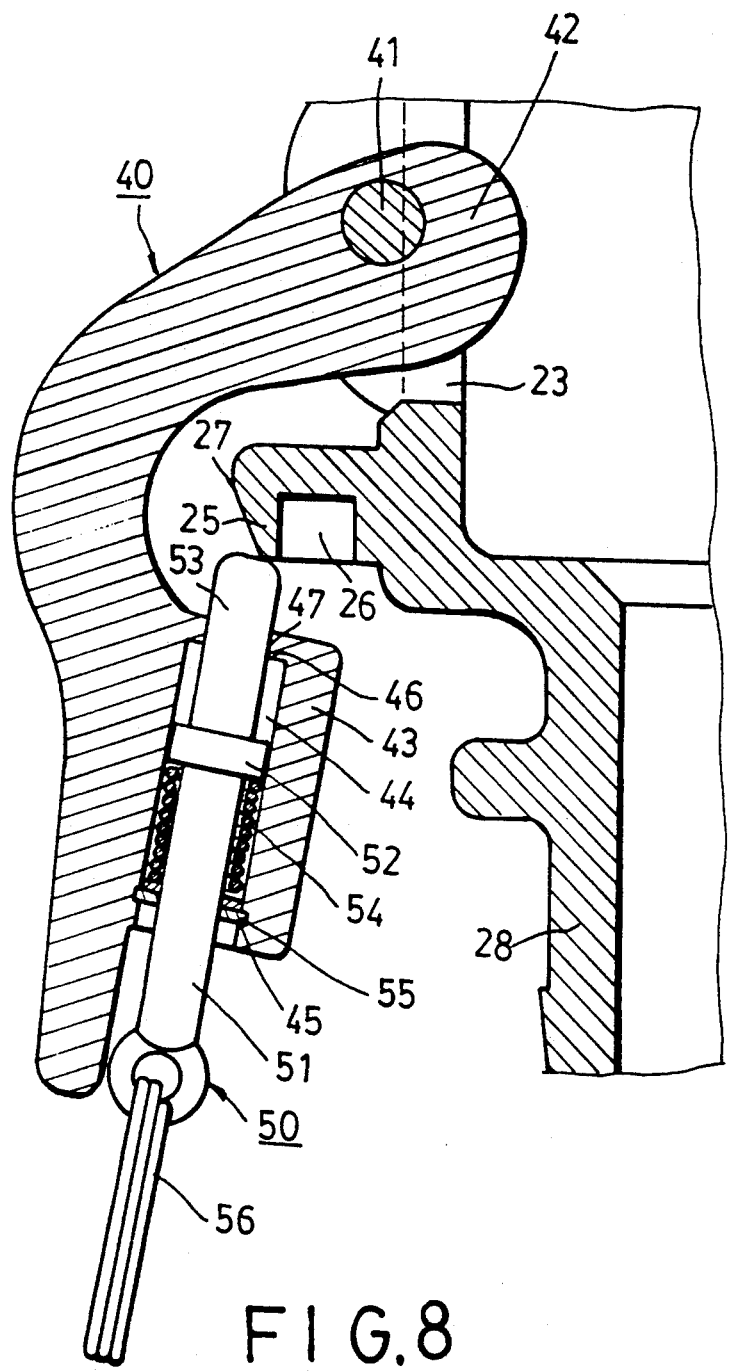
FIG. 8 is an enlarged fragmentary view which illustrates the positioning rod when retracted gradually into a positioning bore that is formed in the press arm due to downward pivoting movement of the latter.

Referring to FIGS. 6, 7 and 8, as the press arms (40) are pivoted to the locking position, the first end portion (53) of the positioning rod (51) eventually abuts against the inclined side surface (27) of the respective retaining seat (25). As the first end portion (53) moves downwardly along the inclined side surface (27) due to further pivoting movement of the corresponding press arm (40), the positioning rod (51) is retracted gradually into the positioning bore (44) against the action of the compression spring (54), as best illustrated in FIG. 8.

Figure 9:
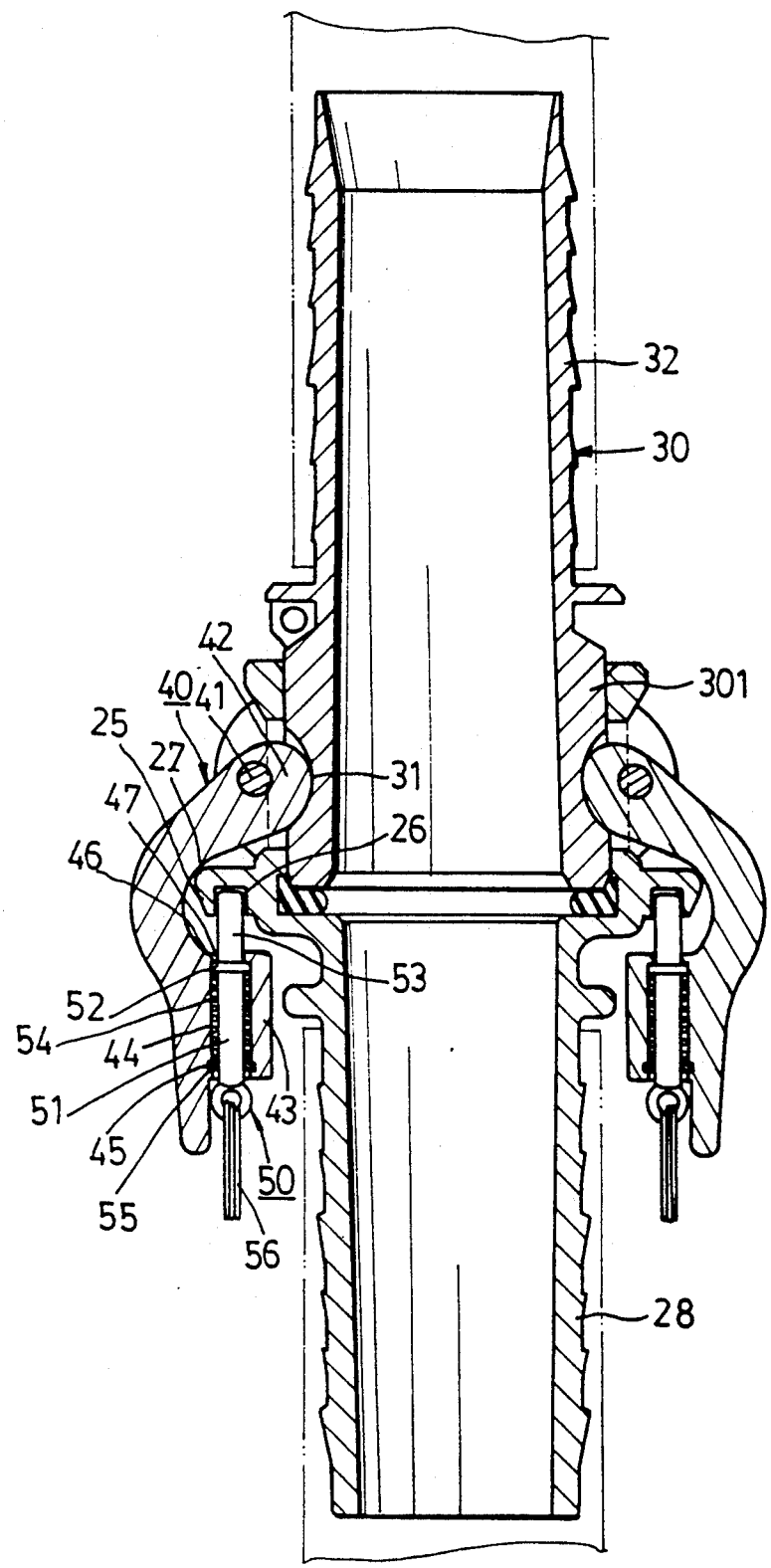
FIG. 9 is a sectional view of the preferred embodiment illustrating the positioning rods when engaging the retaining seats.
Figure 10:
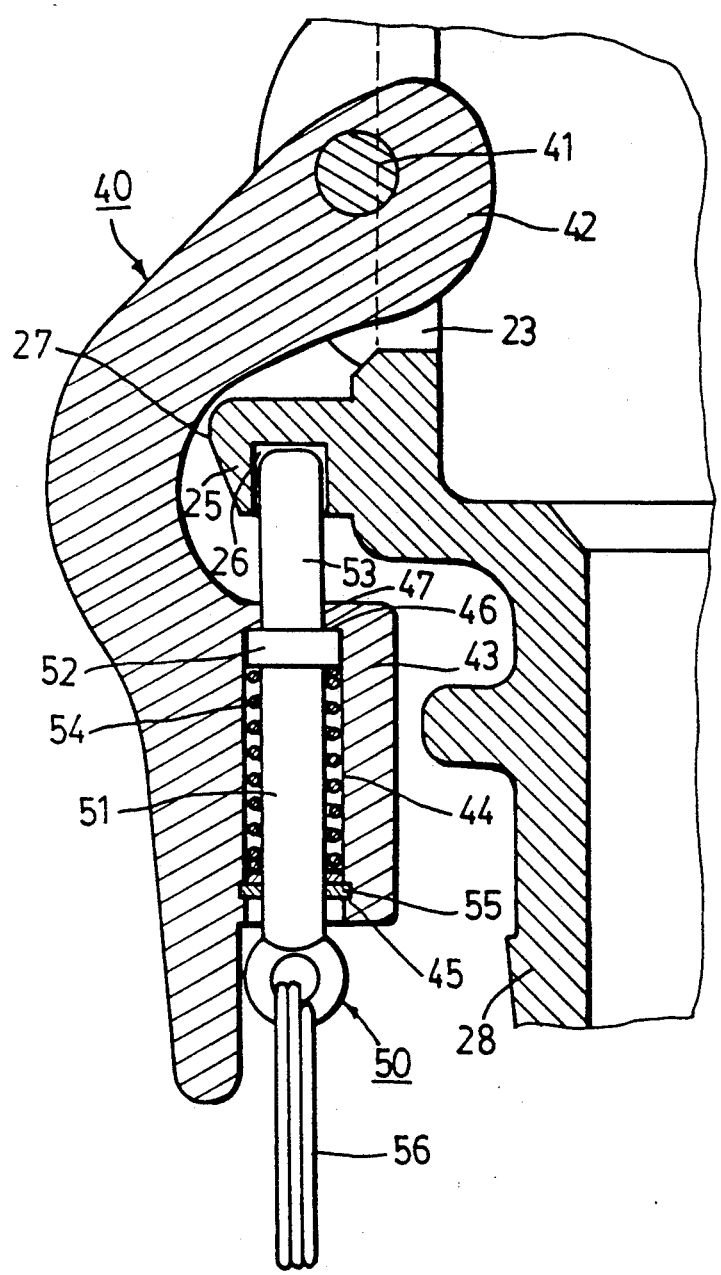
FIG. 10 is an enlarged fragmentary view which illustrates the positioning rod when engaging the respective retaining seat.

Referring to FIGS. 9 and 10, when the positioning bore (44) is aligned with the blind bore (26) in the respective retaining seat (25), the inclined side surface (27) ceases to exert pressure on the first end portion (53) of the positioning rod (51). The compression spring (54) expands to cause the radial flange (52) to abut against the annular flange (46). The first end portion (53) of the positioning rod (51) extends into the blind bore (26) at this stage, thus retaining the press arms (40) on the first connector member (20) so as to prevent untimely movement of the former. Tight engagement between the first and second connector members (20, 30) is therefore ensured.

From the above description, it has thus been shown that the press arms (40) are retained automatically on the first connector member (20) when the press arms (40) are pivoted to the locking position. The tube connecting device of the present invention is thus easier to install than the prior art.

Figure 11:
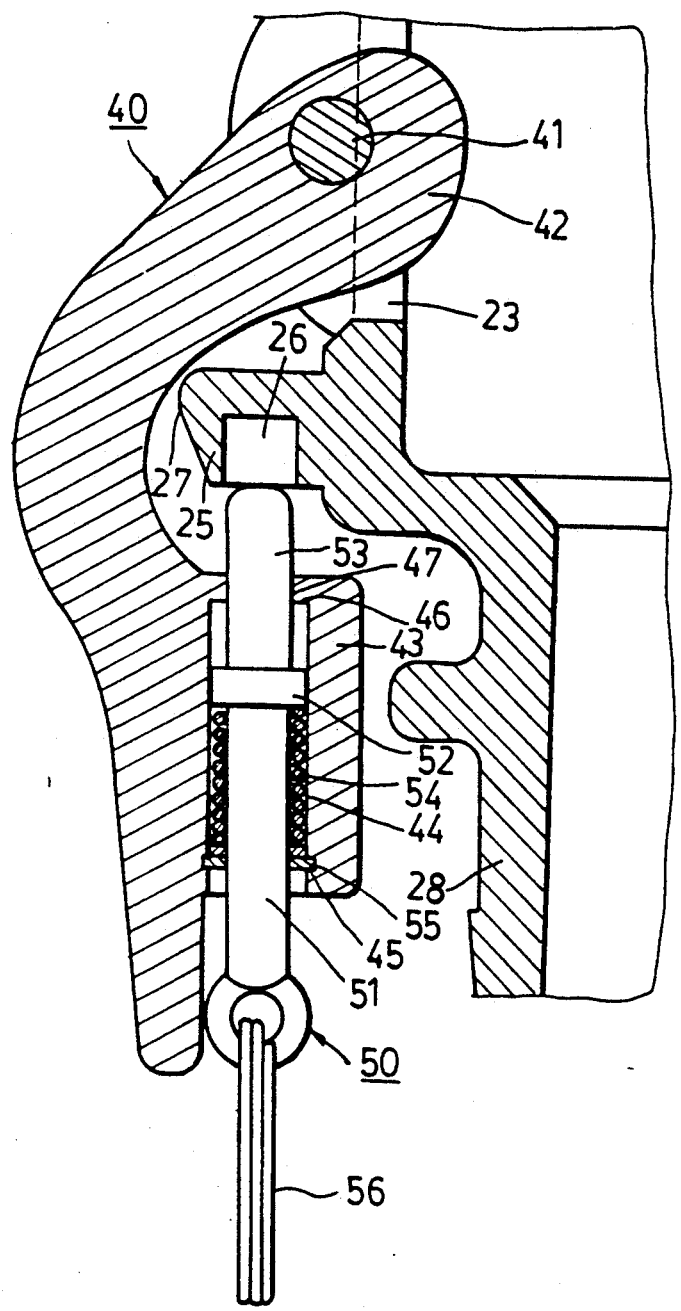
FIG. 11 is an enlarged fragmentary view which illustrates the positioning rod when pulled away from the respective retaining seat.
Figure 12:
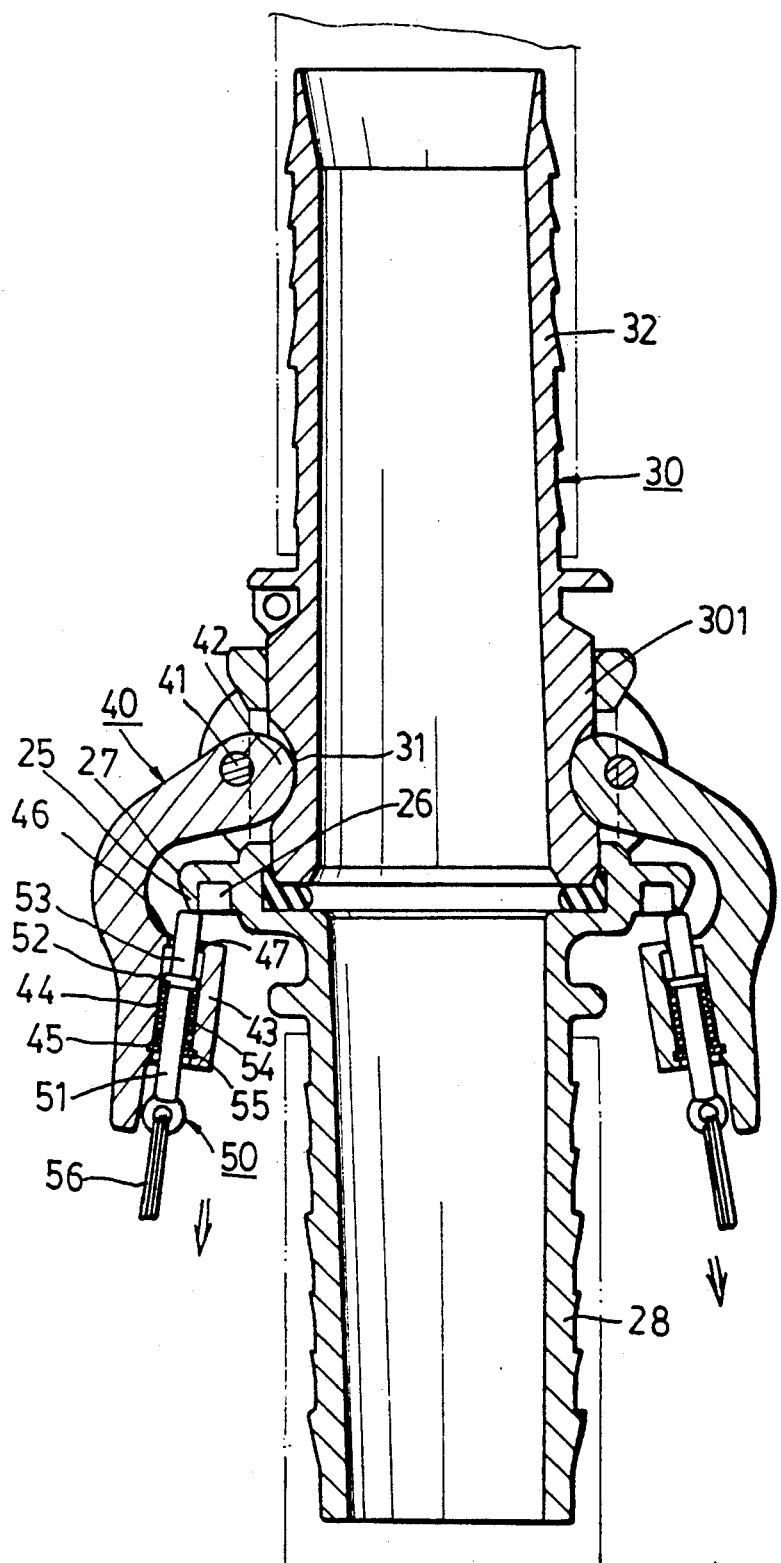
FIG. 12 illustrates the preferred embodiment when the press arms are pivoted upwardly so as to disengage the first and second tubular connector members.

Referring to FIGS. 11 and 12, when it is desired to disengage the second connector member (30) from the first connector member (20), the pull rings (56) are pulled downwardly so as to retract the positioning rods (51) into the respective positioning bore (44) against the action of the compression springs (54), thereby disengaging the first end portion (53) from the respective retaining seat (25). The press arms (40) are then pivoted upwardly to an unlocking position until the cam faces (42) of the press arms (40) cease to extend into the peripheral groove (31) in the second connector member (30). The second connector member (30) can be removed from the first connector member (20) at this stage.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A tube connecting device including
   a first tubular connector member having a receiving end portion formed with a pair of opposite radial openings and an extension end portion to be connected to a corresponding tube;
   a second tubular connector member having an insert end portion which extends into said receiving end portion and an engaging end portion to be connected to a corresponding tube, said insert end portion having an outer surface which is formed with an annular peripheral groove that is registered with said radial openings;
   a pair of press arms, each having one end mounted pivotally to said first connector member adjacent to a respective one of said radial openings and formed with a cam face, each of said press arms being pivotable to a locking position in which said cam face thereof extends into said peripheral groove via the respective said radial opening so as to press against said second connector member at said annular groove in order to secure said second connector member to said first connector member;
   wherein the improvements comprise:
   a pair of retaining seats, each of which projecting outwardly from said first connector member and being disposed below a respective one of said radial openings, each of said retaining seats having an inwardly and downwardly inclined side surface and a bottom formed with a vertical blind bore;
   each of said press arms having an inner side which is formed with a longitudinal positioning seat, said positioning seat being formed with an axial positioning bore which is aligned with said blind bore in a respective one of said retaining seats when said press arm is in said locking position; and
   a pair of retaining units, each of which including: a positioning rod being provided slidably in said positioning bore of a respective said positioning seat and having first and second end portions which extend out of said positioning bore; a biasing unit being disposed in said positioning bore of said respective positioning seat and biasing said positioning rod so that a tip of said first end portion is displaced normally from a pivoting axis of a respective said press arm by a distance equal to that between a plane lying on said inclined side surface of a respective said retaining seat and said pivoting axis of said respective press arm; and a pull ring secured on said second end portion of said positioning rod; said first end portion extending into said blind bore of said respective retaining seat when said respective press arm is in said locking position.

* * * * *